EDWIN T. LAYNG
HAROLD H. STOTLER
SEONG TAE HWANG
INVENTORS

EDWIN T. LAYNG
HAROLD H. STOTLER
SEONG TAE HWANG
INVENTORS 3,553,105
APPLICATION OF CERTAIN EQUATIONS IN A HYDROGENATION PROCESS FOR REMOVING SULFUR FROM A LIQUID HYDROCARBON FEED
Edwin T. Layng, Summit, and Harold H. Stotler, Westfield, N.J., and Seong Tae Hwang, Kansas City, Mo., assignors to Hydrocarbon Research, Inc., New York, N.Y., a corporation of New Jersey
Filed Oct. 31, 1968, Ser. No. 772,121
Int. Cl. C10g 23/10
U.S. Cl. 208—213          7 Claims

ABSTRACT OF THE DISCLOSURE

A process for the desulfurization of heavy gas oils or residuum by the ebullated bed catalytic system wherein the factors of feed characterization, percent desulfurization, temperature, pressure, and space velocity, in consideration of catalyst age and activity, are critically adjusted and coordinated by the formula:

$$\frac{1}{(U_f)} = \frac{1}{1.25 C_t C_s A}\left[\frac{W_f - W_p}{0.6_p{}^2 \times 10^{-6}} + \frac{W_f}{W_p} - 1\right]$$

where:

$W_f$ = average weight percent sulfur in feed
$W_p$ = average weight percent sulfur in the butane and heavier liquid product
$p$ = partial pressure of hydrogen in reactor (p.s.i.a.)
$C_t$ = effect of temperature on the rate of reaction
$C_s$ = effect of extent to which the oil is desulfurized on the rate of reaction
$A$ = the activity of a particular catalyst with a particular age for a particular feedstock
$U_f$ = barrels per day of fresh feed oil passed through the reactor per pound of catalyst present inside the reactor.

BACKGROUND OF THE INVENTION

This invention relates to a continuous process for desulfurizing and hydrocracking heavy gas oils and residua. More particularly, it pertains to the use of the upflow, ebullated bed, contacting system for the removal of sulfur from feed materials, including gas oils and residuum, such as petroleum atmospheric distillation bottoms, petroleum vacuum distillation bottoms, shale oil, shale oil residues, tar sands and coal derived hydrocarbons and hydrocarbon residues.

Desulfurization of heavy petroleum residua and coal derived materials generally presents problems in catalytic hydrogenation systems because of the impurities contained in the feed materials. Generally, these impurities include nitrogen-containing organic compounds and organic and inorganic salts of metals, such as vanadium and nickel. While each of these type contaminants acts in a different way upon the desulfurization catalyst, they eventually result in poisoning and deactivation of the catalytic material. It is because of this, that in the past, it has been difficult, if not impossible, to desulfurize residuum feeds of the type noted above at levels of greater than 70% sulfur removal without excessive catalyst consumption.

The processes now available normally require some type of pre-treatment step in order to faciiltate a subsequent desulfurization step. Thus, systems including desalting, deasphalting and mild hydro-treating steps prior to the main desulfurization step, have been utilized. It is apparent that the use of such pre-treatment steps greatly increases the economic requirement of a given desulfurization process and is not completely effective.

The disclosure of the ebullated bed type contacting system in the Johanson patent, Re. 25,770, has made available to the field of method of obtaining desulfurization of greater than 70 and 80%, while greatly improving catalyst utilization. The ebullated bed system generally involves the introduction of the feed material in the liquid state along with hydrogen into the bottom of a contact zone containing a particulate contacting or catalytic agent. The gaseous and liquid materials are passed upwardly through the contact zone at velocities whereby the bed of particulate material is expanded to a volume at least 10% greater than its rest volume and whereby an interface is created within the contact zone above which the concentration of contact material is less than 0.1 lb. per cubic foot and below which the concentration is greater than 5.0 lbs. per cubic foot. In such a state of expansion, the particulate bed is said to be ebullated. The products, both vapor and liquid, are then removed from the reaction zone for further downstream treatment. Generally, the use of particulate matter in the size range from $\frac{1}{32}$ to $\frac{1}{16}''$ diameter extrudates and micro-spheroidal particles ranging in size from 20 to 325 mesh (U.S.) have been disclosed. Ordinarily, with the smaller size solids described, a once-through operation is contemplated, whereas with the larger extrudated type catalysts, a recycle stream, either internal or external of the reactor, is required in order to achieve sufficient velocities to maintain the expansion of the bed. In any event, however, the nature of the ebullated bed system is such that improved temperature profiles and control in addition to superior contacting is achieved, whereby more efficient desulfurization can be carried out.

Even with this type contacting system, we have found that problems may arise in that the particular operating conditions and combination of conditions have been found to vary critically from feed to feed. Thus, unless special adjustments are made, it is often difficult to quickly arrive at the proper and optimum combination of conditions for processing a given feed.

SUMMARY OF THE INVENTION

We have found a method by which the critical operating conditions for use of the ebullated bed system as described above for the desulfurization of heavy gas oils and residuum materials may be quickly and easily defined. More particularly, we have developed a correlation based on feed characteristics, kinetics of desulfurization and age and type of catalyst, which allows one to precisely define the combinations of operation conditions required for a desired level of desulfurization of a given feed, using the ebullated bed system. Additionally, this correlation now allows one to obtain the optimum desulfurization levels for a given feed material efficiently.

DESCRIPTION OF THE PREFERRED EMBODIMENT

Figure 1:
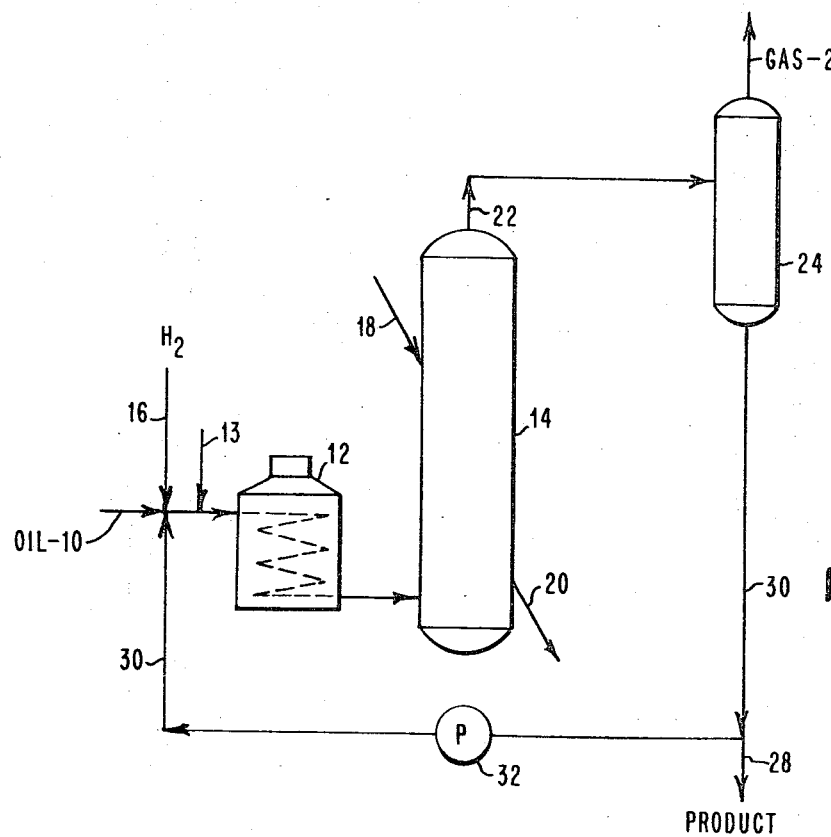
FIG. 1 is a schematic view of an ebullated bed reactor.

Generally, the ebullated bed desulfurization of a heavy feed material as described above, is carried out as diagrammed in FIG. 1 and may be described as follows:

The feed material which normally has at least 25 volume percent of components boiling above about 975° F. at 10 together with hydrogen at 16 and any recycle material in line 30 is heated in heater 12 and then introduced to the bottom of reactor 14. Such a reactor will suitably be charged with a desulfurization catalyst, particles of said catalyst having a narrow size distribution in the range from about 20 to about 325 mesh (U.S. scale). A small makeup of fresh catalyst may be entered with the feed at 13. Alternatively, catalysts in the form of extrudates of about ¼" to about ¹⁄₃₂" diameter, may be used.

The catalyst may be any type of material which can effect hydrogenation of the sulfur compounds in the feed. Particular examples would be cobalt molybdate on alumina, nickel molybdate on alumina and nickel tungstate on alumina. Normally, the catalyst consists essentially of alumina promoted with metals and compounds of metals selected from groups VI$b$ and VIII of the Periodic Table.

The liquid and gas upflow through the bed of catalyst should be such that it will tend to expand the catalyst bed at least 10% based on the bed volume with a fluid flow, and such that the particles are all in random motion in the liquid. In such condition, they are described as ebullated. As stated in the Johanson patent cited above, it is a relatively simple matter to operate any particular process so as to cause the mass of contact material in fluid to become ebullated and to calculate the percent expansion of the ebullated mass of any given set of reaction conditions. In most processes carried out in accordance with this invention, the expanded volume of the ebullated mass will exceed by 10%, but not more than 100% the volume of the settled mass.

Under the preferred conditions of temperature, pressure, throughput and product composition as determined by the formula hereinafter set forth, a total effluent is removed at 22 and introduced to separator 24. The gaseous products are then removed as overhead through line 26 and the bottoms are removed through line 30. A portion of the bottoms material may be recycled by pump 32 to be re-introduced with the feed. Bottoms material from separator 24 which is not recycled is removed through line 28 and may be subjected to the normal type downstream fractionation and separation treatments.

Generally, upflow liquid velocities in the range from about 1 to about 200 gallons per minute per square foot of reactor space are utilized depending on the type catalyst used and the particular severity desired for the process. Generally, with the larger size catalysts, i.e., extrudates and particles having diameters from about ¹⁄₃₂ to about ¼", the liquid velocities required in order to maintain the ebullated state are above 10 gallons per minute per square foot of reactor. In such a case, therefore, the recycle in line 30 is used to supplement the fresh liquid feed in order to maintain the ebullation. In the case, however, when the finer catalysts are utilized, i.e., those catalysts having a range from about 60 to about 270 mesh, a once-through operation is contemplated and the upflow liquid velocities required are normally between about 1 to about 10 gallons per minute per square foot of reaction space. Thus, with the finer catalyst, the recycle is not necessary to maintain the ebullated condition.

In general, it is envisioned that the reaction conditions utilized in desulfurization processes of this type would be within the temperature ranges from about 750 to about 900° F. with a total pressure in the range from about 800 to about 3000 p.s.i.g., a hydrogen throughput in the range from about 1000 to about 10,000 s.c.f. per barrel and with a total space velocity greater than 0.25 $V_f/hr./V_r$.

We have found that in catalytic hydrodesulfurization processing of heavy oils in the type system and under the conditions described above, the rate of desulfurization of the feed material is determined by two factors. First, the rate at which the sulfur in the feed, i.e., the sulfur-containing organic compounds, is absorbed on the catalyst surface at the temperatures and pressures existing in the reaction zone; and second, by the rate at which the absorbed sulfur reacts with the hydrogen present to form hydrogen sulfide gas. Thus, the overall rate of desulfurization can be described for the above reactor system as follows:

$$\frac{1}{(U_f)} = \frac{1}{k}\left[\frac{W_f - W_p}{0.6_p{}^2 \times 10^{-6}} + \frac{W_f}{W_p} - 1\right] \quad (1)$$

where:

$U_f$=barrels per day of fresh feed oil passed through the reactor per pound of catalyst present inside the reactor
$k$=reaction rate constant
$W_f$=average weight percent sulfur in the fresh oil fed to each reactor stage
$W_p$=average weight percent sulfur present in the butane and heavier liquid product from each reactor stage
$p$=partial pressure of hydrogen inside the reactor, p.s.i.a.

Figure 2:
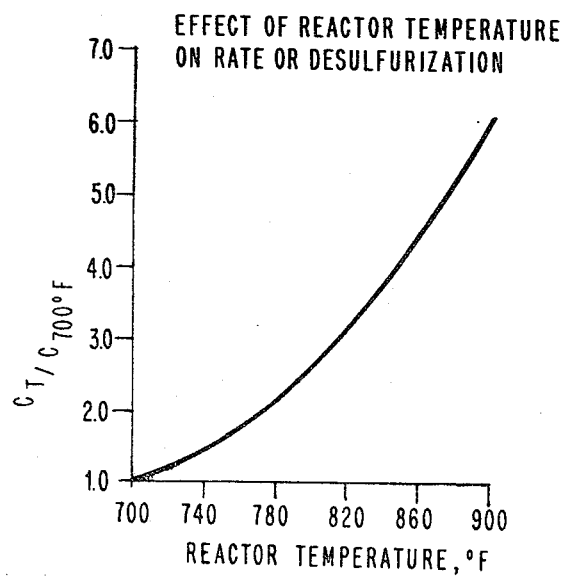
FIG. 2 is a chart showing the effect of reactor temperature on rate of desulfurization.

In the desulfurization process described above, we have found that the reaction rate constant can be expressed as follows:

$$k = 1.25\, C_t C_s A \quad (2)$$

where:

$C_t$=the effect of temperature on the rate of reaction
$C_s$=the effect of the extent to which the oil is desulfurized on the rate of reaction
$A$=the activity of a particular catalyst with a particular age and for a particular feed stock Additionally, we have found that $C_t$ can be expressed as follows:

$$\text{Log}_e C_t = 10.94389 - \frac{14{,}373.8}{T} \quad (3)$$

where T=reactor temperature, ° R. The graphical relationship for this equation is shown in FIG. 2.

Figure 3:
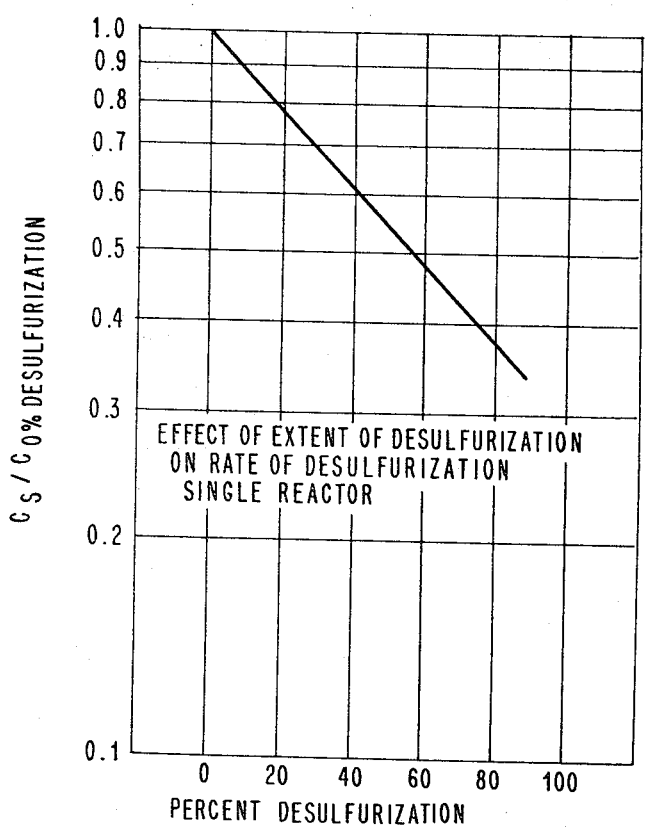
FIG. 3 is a chart showing the effect of desulfurization on the rate of desulfurization.

We have also found that $C_s$ for a single reactor system can be expressed as follows:

$$\text{Log}_e C_s = 0.518794 - 0.0121194 X \quad (4)$$

where X=the weight percent sulfur removed from the oil. The graphical relationship for this equation is shown in FIG. 3.

Generally, the reaction rate constant is a function of the temperature, the age of the catalyst, the type catalyst and the particular feed material to be desulfurized. However, as feedstocks consist of a wide variety of organic sulfur compounds and we have found that the rate of removal of sulfur from some of these compounds is significantly slower than from other compounds, the overall rate of desulfurization decreases as the percentage desulfurization is increased. It is noted in FIG. 3 that the overall reaction rate depends upon the percentage removal of sulfur from the feed. Thus, it is a function of the degree of desulfurization which has been achieved and, in reality, can be expressed as a first order reaction rate constant. Therefore, the rate of desulfurization decreases as the degree of desulfurization, i.e., the level of sulfur in a given portion of the material being processed decreases. In other words, the average rate of desulfurization in a reactor in which 25% desulfurization is desired is much faster than the average rate when 80% desulfurization is required.

In a reactor system containing two or more stages $C_s$ as expressed above can be used for the first stage. For succeeding stages the average value of $C_s$ for each stage can be expressed as follows:

$$\text{Log}_e C_s = 0.43178 + 0.009065 X - 0.0004383 X^2 \quad (5)$$

Figure 4:
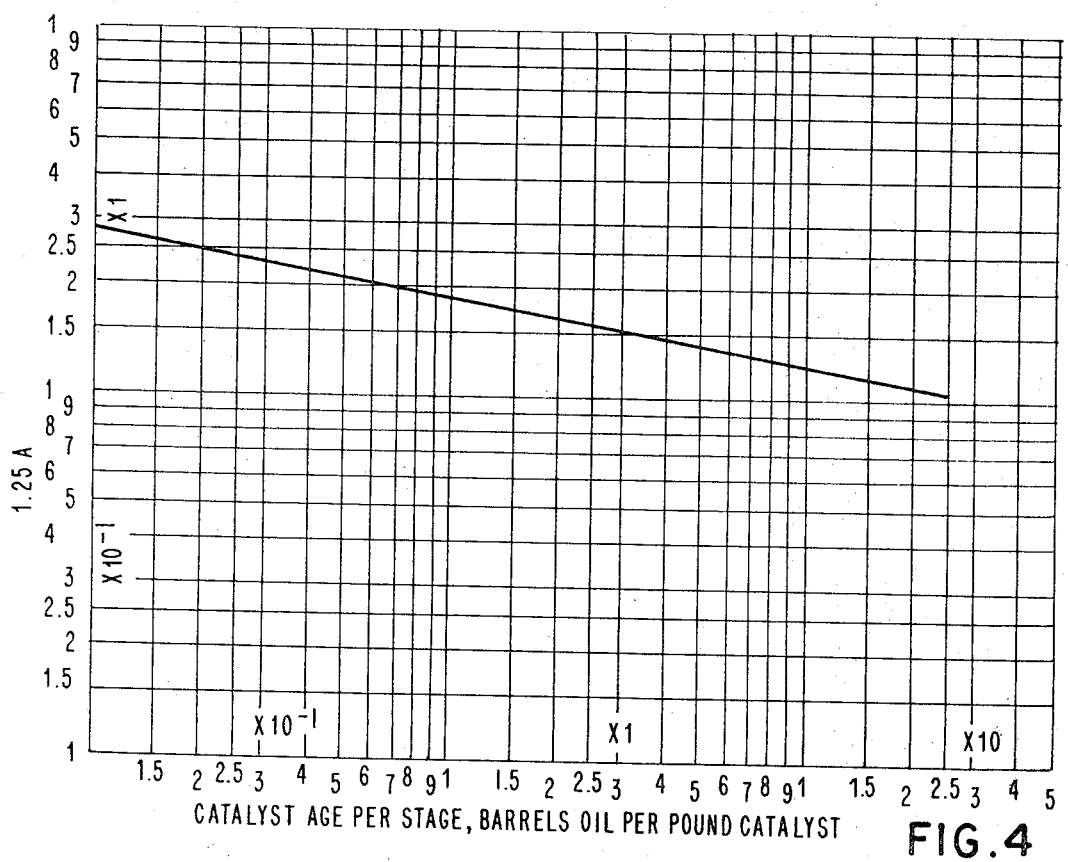
FIG. 4 is a chart showing the effect of catalyst age per stage measured in barrels of oil per pound of catalyst on A.

A of Equation 2 is experimentally determined and is characteristic of a given feed stock, catalyst and catalyst age. It may be arrived at for a particular catalyst by processing the feed using a pilot or experimental unit, measuring the amount of sulfur removed from the feed and inserting the experimental temperature, pressure, space velocity, feed and product sulfur concentrations into Equations 1 through 5 and solving for A. FIG. 4 shows a plot of values of A experimentally determined at various catalyst ages for a vacuum residuum with a particular catalyst. Generally, we have found that A will vary from 0.3 to about 8 for feed materials in the range of commercial interest and for the catalyst presently available. Additionally, we have found that catalyst staging has little effect on the values of A. By catalyst staging it is normally meant that two smaller stages containing the same amount of catalyst as one larger stage is used.

Figure 5:
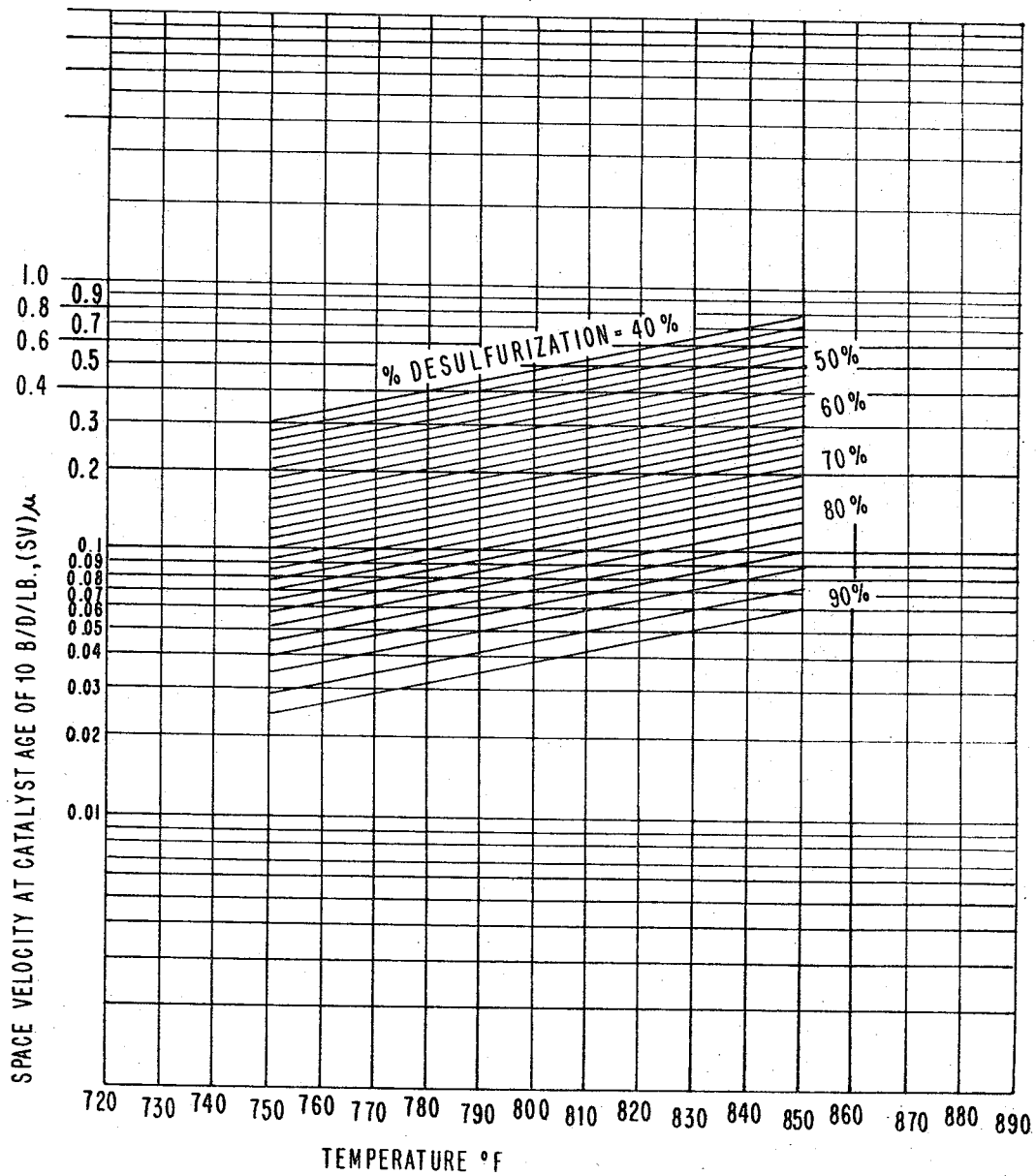
FIG. 5 is a partial chart showing the relation of space velocity to temperature for different degrees of desulfurization.

Thus, by using the relationship as defined by Equations 1 through 5, it is possible for a given feed material and a given catalyst to determine prior to actual processing, the required severity, i.e., the space velocity which will be required in order to achieve the desired percent of desulfurization of the feed. Particularly, for a given feed material, it is possible with our correlation, to develop a family of curves as shown in FIG. 5 for processing in an ebullated bed reactor and for defining the limits of optimum efficiency for the desulfurization. The graphical representation of FIG. 5 represents calculations using a feed containing sulfur and a catalyst with age of 10 barrels per day per pound and a hydrogen partial pressure of 2000 p.s.i.g. It thus becomes possible from our correlation to develop such working graphs which will allow prediction of the best combination of conditions for optimum desulfurization.

Although the above examples and discussion discloses a preferred mode of embodiment of applicant's invention, it is recognized that from such disclosure, many modifications will be obvious to those skilled in the art and it is understood, therefore, that our invention is not limited to only those specific methods, steps or combination or sequence of method steps described, but covers all equivalent steps or methods that may fall within the scope of the appended claims.

We claim:

1. A hydrogenation process for a liquid hydrocarbon feed material of the type wherein the feed is passed together with a hydrogen-rich gas, upwardly through a contact zone containing a bed composed of a hydrogenation catalyst at temperatures within the range from about 700° F. to about 900° F. and total pressures in the range from about 800 to about 3000 p.s.i.g., hydrogen throughput in the range from about 1,000 to about 10,000 s.c.f./bbl., the velocities of the liquid and gases being such as to expand to bed to a volume at least 10 percent greater than its raised volume and wherein gaseous and liquid effluents are removed from the contact zone, the improvement which comprises optimizing the combination of process operating variables within the operating conditions as defined by the following equations where A falls between 0.3 and 8 depending upon feedstock, catalyst type and catalyst age:

$$\frac{1}{(U_f)} = \frac{1}{1.25 C_t C_s A} \left[ \frac{W_f - W_p}{0.6_p{}^2 \times 10^{-6}} + \frac{W_f}{W_p} - 1 \right]$$

where:

$$\text{Log}_e C_t = 10.94389 - \frac{14{,}373.8}{T}$$

and $$\text{Log}_e C_s = 0.518794 - .0121194 X$$

where:

$W_f$ = average weight percent sulfur in feed
$W_p$ = average weight percent sulfur in the butane and heavier liquid product
$p$ = partial pressure of hydrogen in reactor (p.s.i.a.)
$C_t$ = effect of temperature on the rate of reaction
$C_s$ = effect of extent to which the oil is desulfurized on the rate of reaction
$A$ = the activity of a particular catalyst with a particular age for a particular feedstock
$U_f$ = barrels per day of fresh feed oil passed through the reactor per pound of catalyst present inside the reactor
$T$ = reactor temperature, ° R.
$X$ = the weight percent of sulfur removed from the oil.

2. The process as claimed in claim 1 wherein the feed is a material selected from the group consisting of gas oils and residuum, including petroleum atmospheric distillation bottoms, petroleum vacuum distillation bottoms, shale oil, shale oil residues, tar sands and coal derived hydrocarbons and hydrocarbon residues.

3. The process as claimed in claim 2 wherein the contact agent is composed of particulate extrudates having diameters in the size range from 1/32" to 1/16".

4. The process as claimed in claim 3 wherein the liquid velocity in the contact zone is greater than 10 gallons per minute per square foot of reactor and wherein a portion of the liquid effluent is recycled to the contact zone to maintain said liquid velocity.

5. The process as claimed in claim 2 wherein the contact agent is a particulate solid having a size in the range from about 20 to about 325 mesh (U.S.) and wherein the liquid velocity in the contact zone is between about 1 to about 10 gallons per minute per square foot of reactor.

6. The process as claimed in any one of claims 1, 2, 3, 4 or 5 wherein the contact agent is a catalyst selected from the group consisting of alumina promoted with metals and compounds of metals selected from groups VIb and VIII of the Periodic Table.

7. The process as claimed in any one of claims 1, 2, 3, 4 or 5 wherein there is more than one contact zone, the effluent from the first zone passing to each subsequent zone in series wherein $C_s$ for the subsequent zones is determined from the relationship;

$$\text{Log}_e C_s = 0.43178 + 0.009065 X - 0.0004383 X^2$$

References Cited

UNITED STATES PATENTS

| | | | |
|---|---|---|---|
| 2,893,945 | 7/1959 | Berg | 208—216 |
| 2,987,468 | 6/1961 | Chervenak | 208—216 |
| 3,113,921 | 12/1963 | Hemminger | 208—216 |
| 3,183,178 | 5/1965 | Wolk | 208—213 |
| 3,188,286 | 6/1965 | Van Driesen | 208—216 |
| Re. 25,770 | 4/1965 | Johanson | 208—213 |

DELBERT E. GANTZ, Primary Examiner

G. J. CRASANAKIS, Assistant Examiner

U.S. Cl. X.R.

208—216